P. EVANS.
CHANGE SPEED GEAR.
APPLICATION FILED MAR. 6, 1907.

931,288.

Patented Aug. 17, 1909.
2 SHEETS—SHEET 2.

Witnesses:

Inventor
Powell Evans.
by his Attorneys

UNITED STATES PATENT OFFICE.

POWELL EVANS, OF PHILADELPHIA, PENNSYLVANIA.

CHANGE-SPEED GEAR.

No. 931,288.

Specification of Letters Patent.

Patented Aug. 17, 1909.

Application filed March 6, 1907. Serial No. 360,843.

*To all whom it may concern:*

Be it known that I, POWELL EVANS, a citizen of the United States, residing in Philadelphia, Pennsylvania, have invented certain Improvements in Change-Speed Gears, of which the following is a specification.

One object of my invention is to provide a relatively simple and efficient change speed gear, especially designed for use on automobiles, and having its parts so arranged as to make possible the operation of a driven shaft at any one of several forward speeds or a single reverse speed. I also desire to so mount certain of the gear wheels as to make possible not only a compact arrangement of the various parts, but also to secure maximum strength and reliability of the device under operative conditions. These and other advantageous ends I secure as hereinafter set forth, reference being had to the accompanying drawings, in which:—

Figure 1:
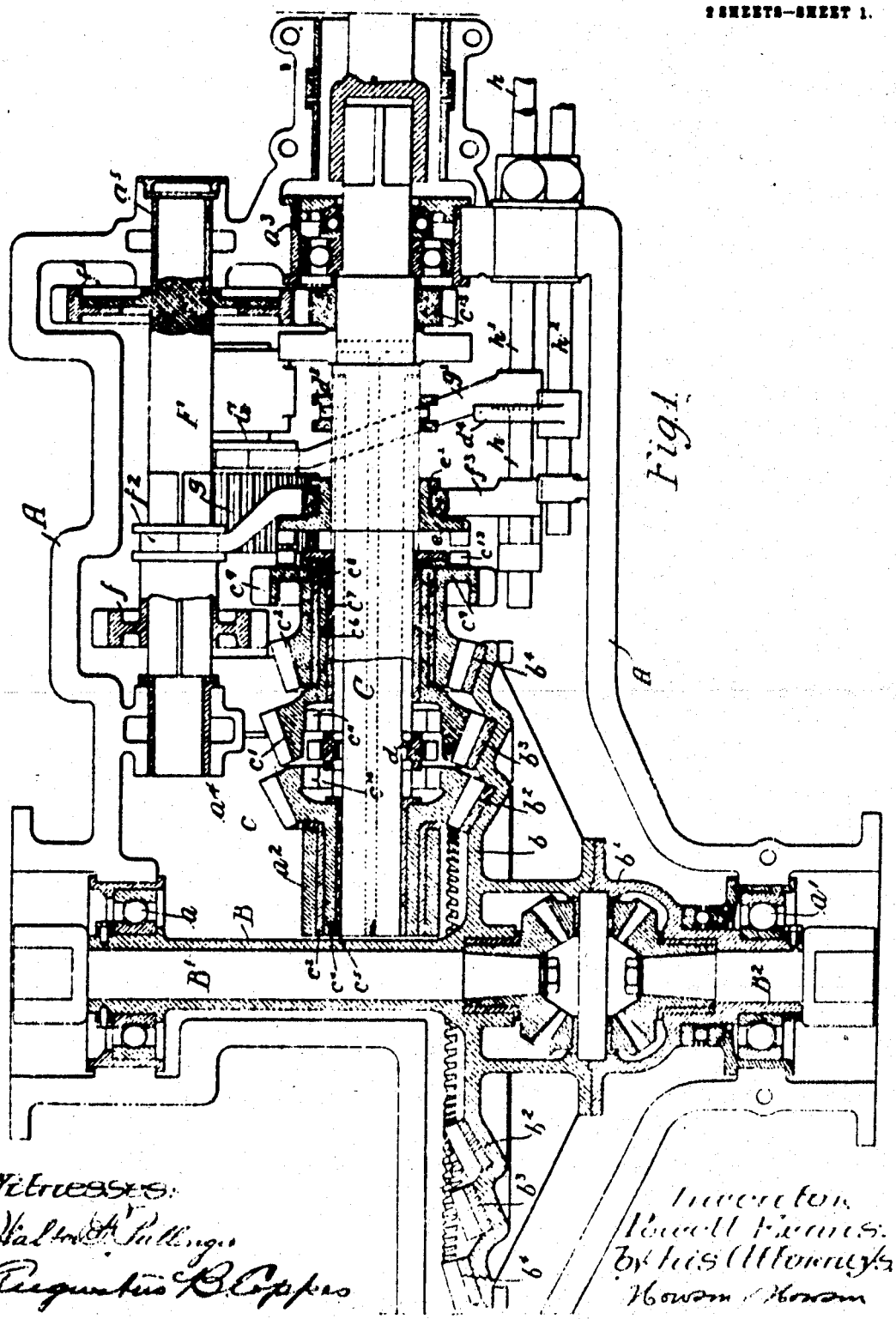
Figure 2:
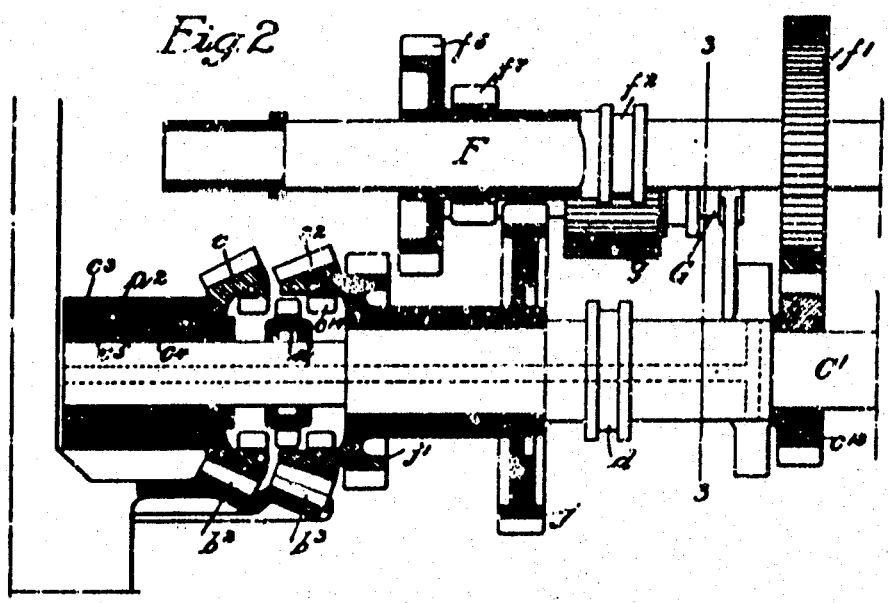
Figure 3:
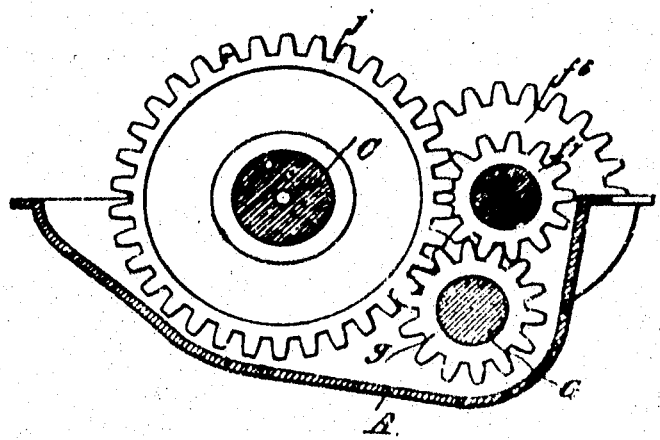

Figure 1, is a horizontal section of my improved change speed gear, showing one arrangement of parts; Fig. 2, is a similar view of a slightly modified form of change speed gear, also constructed according to my invention, and Fig. 3, is a vertical section taken on the line 3—3, Fig. 2, further illustrating the construction of the device.

In the above drawings, A represents a casing constructed to inclose and carry the various parts comprising my change speed gear. It will be understood that this casing preferably consists of an upper part with a cover, and a lower part, of which, however, the former has been omitted inasmuch as its detail construction forms no part of the present invention. The casing is provided with bearings $a$ and $a'$, preferably of the anti-friction type, wherein is mounted a tubular shaft B, which, in the present instance, has formed integral with it a plate-like structure $b$ for the support of circular beveled racks or gears hereinafter referred to. The said shaft, beyond said plate structure, is made in the form of an inclosing box $b'$ in which is mounted differential gearing, whereby the tubular shaft B is operatively connected to the two parts $B'$ and $B^2$ constituting the wheel driving shafts. This inclosing box $b'$ is made in two separable sections, as illustrated, so as to permit of access being had to the differential mechanism.

Upon the plate structure $b$ are mounted three concentric beveled racks or gears $b^2$, $b^3$ and $b^4$, respectively meshing with three beveled pinions $c$, $c'$ and $c^2$ through which extends the driving shaft C, which, it will be understood, is directly connected to the motor shaft. For the support of said shaft C, I provide bearings $a^2$ and $a^3$; the latter being of the anti-friction type and also designed to serve as a thrust bearing.

It will be noted that the bearing $a^2$ is provided with a lining sleeve $c^3$ and within this is carried a cylindrical extension $c^4$ of the gear $c$. This latter in turn has in it a sleeve $c^5$ within which operates the shaft C.

By the use of a bearing of the above construction I am enabled to give ample support to the pinion shaft without having any portion thereof overhung as is usually the case.

The pinion $c'$, like the pinion $c$, is also provided with a cylindrical extension $c^6$, having interposed between it and the shaft C a sleeve $c^7$ and outside of it a second sleeve $c^8$ upon which is mounted the pinion $c^2$. Said latter pinion, in the present instance, has formed integral with it a spur gear $c^9$ and like the other parts of my device, is made of ample length so as to have the necessary bearing surface upon its shaft.

The adjacent faces of the two pinions $c$ and $c'$ are provided with internal teeth $c^{10}$ and $c^{11}$ and between them there is slidably mounted upon the shaft C a toothed structure $d$, which, however, is forced to turn with the shaft. It may, however, be moved into engagement with either of the sets of internal teeth by the proper manipulation of a collar $d'$ slidably mounted upon the shaft C. This structure is operated by means of longitudinally extending rods, not shown in the present instance, but clearly illustrated in an application for patent filed by me on the 10th day of May, 1906; Serial No. 316,086.

Upon the vertical face of the spur gear $c^9$ opposite that toward the pinion $c^2$, I provide a circular series of teeth $c^{12}$ designed to be engaged by the teeth of a second clutch member $e$ mounted upon a sliding collar $e'$ keyed to the shaft C so as to be compelled to rotate therewith.

Parallel to the shaft C, I provide a third shaft F supported in bearings $a^4$ and $a^5$ and having upon it two spur gears $f$ and $f'$. The first of these has attached to it a collar $f^2$, and while being compelled to turn with the shaft F, may be moved into or out of engagement with the spur gear $c^9$. The second gear $f'$ is permanently in mesh with a gear $c^{12}$ fixed in any desired manner to the shaft C adjacent to the bearing $a^2$.

A reverse shaft G is provided, parallel with the shafts C and F, having suitable bearings in the casing, and carried upon it is a relatively long faced pinion $g$. This pinion may be made to slide upon the shaft G into and out of engagement with the two gears $c^9$ and $f$.

For the purpose of making the various combinations of gears, I provide three control rods $h$, $h'$ and $h^2$, which extend into the casing and have mounted upon them arms for operating the various speed changing parts. The rod $h$, for example, carries the arm $f^3$, whereby the spur gear $f$ may be moved into and out of engagement with the gear $c^9$, while the rod $h'$ carries the arm $g'$ for sliding the reverse pinion $g$ into and out of mesh with the spur gears $c^9$ and $f$. Finally, the rod $h^2$ carries an arm $d^5$ engaging the collar $d'$ so as to move the toothed structure $d$ into and out of engagement with the sets of internal teeth $c^{10}$ and $c^{11}$ of the two beveled pinions $c$ and $c'$. The arm $f^3$, in addition to being connected to the collar $f^2$ for operating the gear $f'$, is also designed to operate the movable clutch member $e$; being made to engage the part $e'$ so as to be capable of moving the teeth $e$ into engagement with the teeth $c^{12}$.

With the above described arrangement of parts, it will be seen that in order to secure the lowest forward speed the rod $h$ is moved forwardly, thereby bringing the gear $f$ into engagement with the gear $c^9$. As a consequence, power is transmitted from the shaft C to the spur gears $c^{12}$ and $f'$, shaft F, spur gears $f$ and $c^9$, beveled pinion $c^2$, circular rack $b^4$ to the shaft B, and through the differential gearing to the wheel shafts B' and B². For the next faster speed the control rod $h$ is moved to the rear, past the position of disengagement illustrated in Fig. 1, so that the teeth of the clutch member $e$ engage the teeth $c^{12}$, and, as a consequence, power is transmitted from the shaft C directly to the spur gear $c^9$, and hence to the beveled pinion $c^2$ and rack $b^4$. The shifting of the rod $h^2$ in a forward direction causes the teeth of the structure $d$ to engage the internal teeth $c^{11}$ of the gear $c'$, thereby directly coupling it to the driving shaft C so that power is transmitted from this shaft to the structure $d$, the pinion $c'$, rack $b^3$ and hence to the two wheel shafts B' and B². The movement of the control rod $h^2$ in the opposite direction brings the toothed structure $d$ into engagement with the internal teeth $c^{10}$, thereby operatively coupling the pinion $c$ to the rack $b^3$. In order to reverse the direction of motion of the wheel shafts, I move the control rod $h'$ to the rear so as to bring the wide faced pinion $g$ into engagement with the two spur gears $f$ and $c^9$. Power is thus transmitted from the shaft C through the spur gears $c^{12}$ and $f'$, shaft F, spur gear $f$, pinion $g$, spur gear $c^9$, beveled gear $c^2$, and beveled rack $b^4$.

In that form of my invention shown in Fig. 2, I have modified the construction by connecting to the bevel gear $c^2$ another spur gear $j$; mounting this upon the extended cylindrical portion upon which are also carried said beveled gear $c^2$ and a spur gear $j'$, serving in this instance as the equivalent of the spur gear $c^9$. The beveled gear $c^2$ is provided with internal teeth $c^{14}$ and is designed to coöperate with a toothed structure $d$, as in the case illustrated in Fig. 1, where a similar device is employed with the gear wheel $c'$. The shaft F, as before, carries a spur gear $f^5$ as well as a pinion $f^4$, both connected together and to the collar $f^2$ so as to be longitudinally movable of the shaft while compelled to turn therewith, while the shaft F is permanently connected to the driven shaft C by means of the spur gear $f'$ and the gear $c^{12}$. When, therefore, it is desired to secure the first or lowest speed, the two gears $f^5$ and $f^4$ are moved forwardly upon their supporting shaft by means of the arm $f^3$ and the collar $f^2$ so as to bring the pinion $f^4$ into mesh with the gear $j$. Inasmuch as the beveled pinion $c^2$ is permanently in mesh with the beveled rack $b^4$, power is now transmitted from the shaft C to the gear $c^{12}$, thence to gear $f'$, shaft F, pinion $f^4$, gear $j$, and through the beveled pinion $c^2$ to the rack $b^4$. For the second speed, the two gears $f^5$ and $f^4$ are moved by means of the aforesaid arm and collar to the rear, so that the gear $f^4$ is not only out of mesh with the gear $j$, but the gear $f^5$ is brought into mesh with the gear $j'$ thereby transmitting power from the shaft F, gears $f^5$ and $j'$ to the beveled pinion $c^2$ and beveled rack $b^4$, as before. For the third speed, the toothed structure $d$ is moved forwardly, as before, while the gears $f^5$ and $f^4$ are permitted to remain in their neutral positions illustrated in Fig. 2. The beveled pinion $c^2$ is thus operatively connected to the shaft C through said structure $d$ and the internal teeth $c^{14}$.

From the above, it will be seen that I have provided a change speed gear having comparatively few parts and yet capable of a relatively large number of combinations. Moreover, by supporting the driving shaft C in a bearing placed between the beveled pinion $c$ and the transverse shaft B, I make the whole mechanism structurally stronger and more rigid than would be the case were it overhung, as is commonly the practice. Not only is the shaft thus supported in an ample and suitably placed bearing, but all of the beveled pinions, by the peculiar arrangement shown, are also supported in a manner which conduces to the best and most efficient operation.

I claim:—

1. A transmission gear including two shafts substantially at right angles to each other, a plurality of bevel gears carried on one of the shafts, beveled pinions on the other shaft and meshing with said gears, a bearing for one of the shafts placed between one of the beveled pinions and the other shaft, one of said beveled pinions having an extension projecting toward said other shaft into the bearing, and another pinion having an extension projecting in the opposite direction, a spur gear mounted on said latter extension, devices for connecting either of the pinions to their shaft, with other means for connecting said spur gear to the shaft, substantially as described.

2. A change speed gear including two shafts substantially at right angles to each other, and a third shaft parallel to one of said shafts, a plurality of beveled pinions mounted upon one of the shafts, a plurality of beveled gears meshing respectively with said pinions and mounted on another shaft, a bearing between one of the beveled pinions and the latter shaft, said latter pinion having a portion extending into said bearing and surrounding the shaft, and another pinion also having an extended portion, with a third pinion mounted on said latter extended portion, a spur gear connected to said last pinion, a device for connecting either of the two first pinions with their shaft at will, another device for independently connecting the third pinion to the shaft, and a gear on the third shaft movable into and out of engagement with the gear on the first shaft, substantially as described.

3. A change speed gear including two shafts substantially at right angles to each other, a plurality of beveled gears on one of the shafts, a plurality of beveled pinions on the other shaft respectively meshing with said beveled gears, a bearing for one of the shafts between the other shaft and one of the pinions, said pinion having an extension projecting into said bearing, another pinion also having an extension, a third pinion mounted upon said extension, sleeves respectively between the first and second pinions and the shaft, a third sleeve between the extension of the first pinion and the bearing, and a fourth sleeve between the second and third pinions, substantially as described.

4. A transmission gear including a shaft, a plurality of bevel gears mounted thereon and facing in the same direction, a bearing for the shaft, one of the gears having an extension surrounding the shaft and projecting into the bearing, the next adjacent gear being also provided with an extension, both of said gears having supplementary teeth on their body portions in addition to their driving teeth, a toothed structure on the shaft, means for moving the said structure to cause its teeth to engage or disengage the supplementary teeth of either gear, with a third gear mounted on the extension of the second gear, and mechanism capable of operatively connecting said third gear at will so that it is driven from the shaft, substantially as described.

5. A transmission gear including a shaft, a plurality of bevel gears mounted thereon and facing in the same direction, a bearing for the shaft, one of the gears having an extension surrounding the shaft and projecting into the bearing, the next adjacent gear being also provided with an extension, both of said gears having supplementary teeth within recesses in their body portions, a toothed structure nonrotatably fixed to the shaft between the gears, and means for moving said structure into engagement with either of the sets of supplementary teeth of said gears, with two connected gears mounted on the extension of the second gear, substantially as described.

In testimony whereof, I have signed my name to this specification, in the presence of two subscribing witnesses.

POWELL EVANS.

Witnesses:
G. H. SCHULER,
J. J. JACKSON.